3,449,350
CERTAIN PYRAZOLE-3-CARBOXYLIC ACID
HYDRAZIDE DERIVATIVES
Gordon Northrop Walker, Morristown, N.J., assignor to
Ciba Corporation, a Corporation of Delaware
No Drawing. Continuation-in-part of applicaton Ser. No.
581,465, Sept. 23, 1966. This application June 24, 1968,
Ser. No. 739,135
Int. Cl. C07d 57/00, 49/18; A61k 25/00
U.S. Cl. 260—295.5     4 Claims

ABSTRACT OF THE DISCLOSURE

Pyrazole-3-carboxylic acid hydrazides of the formula

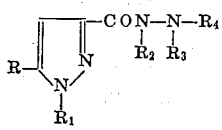

R=cycloalkenyl or azacyclic aryl
$R_{1,2}$=H or alkyl
$R_{3,4}$=H, or alkyl or alkyl(id)ene quaternaries and salts thereof exhibit antitumor effects.

Cross-references to related applications

The present application is a continuation-in-part of application Ser. No. 581,465, filed Sept. 23, 1966, now abandoned.

Summary of the invention

The present invention concerns and has for its object the provision of new pyrazole-3-carboxylic acid hydrazides of the Formula I

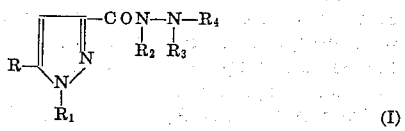

in which R is cycloalkenyl or azacyclic aryl, each $R_1$ to $R_4$ is hydrogen or lower alkyl, or $R_3$ and $R_4$, when taken together, is lower alkylene or alkylidene, of quaternaries and salts thereof, as well as of corresponding pharmaceutical compositions and of methods for the preparation and application of these products. Said compositions are useful tumor inhibiting and antibacterial agents.

Description of the preferred embodiments

The cycloalkenyl radical R, for example, stands for mono- or bicyclic cycloalkenyl having 5 to 7 ring-carbon atoms and whose double bond preferably is in conjugation to the pyrazole ring. It represents above all 1-cyclohexenyl, but also, for example, 1-cyclopentenyl, 1-cycloheptenyl or 5-norborn-2-enyl. The azacyclic aryl radical, for example, represents above all 3-pyridyl, but also 2- or 4-pyridyl. These radicals may be unsubstituted or substituted by one or more than one of the same or of different substituents, preferably by lower alkyl, such as methyl, ethyl, n- or i-propyl or -butyl. The term "lower" referred to above and hereinafter in connection with organic radicals or compounds respectively, defines such with up to 7, preferably up to 4, carbon atoms.

The radicals $R_1$ to $R_4$ preferably represent hydrogen, but also stand for lower alkyl, e.g. that mentioned above. $R_3$ and $R_4$, when taken together, also stand for lower alkylene, (forming with the terminal nitrogen atom an azacyclic saturated ring), e.g. 1,2-ethylene, 1,2- or 1,3-propylene, 1,4-butylene,1,4- or 1,5-pentylene or 2,6-hexylene, or lower alkylidene, e.g. ethylidene, 1- or 2-propylidene or 2-butylidene.

The quaternaries are preferably lower alkyl- of phenyl-lower alkyl-, e.g. benzyl-, 1- or 2-phenylethyl-quaternaries.

The compounds of this invention have valuable pharmacological properties. For example, they exhibit, besides antibacterial, primarily tumor inhibiting effects, as can be demonstrated in animal tests using, for example, mice or rats as test objects. For example, when applied at intraperitoneal or oral doses between about 10 and 300 mg./kg./day to mice or rats having, for example, Adeno E0771, Ehrlich, Crocker, Walker 256, Uterns T8 or Flexner Joblin carcinoma or sarcoma, an inhibition of the size (volume) of the tumor is observed, a reduction in the accurence of spontaneous tumors in inbred mice, as well as a prolongation in the survival time of these test animals, especially those having leukemia L 1210.

Particularly useful are compounds of the Formula I, in which R stands for cyclohexenyl, (lower alkyl)-cyclohexenyl, pyridyl or (lower alkyl)-pyridyl, each of $R_1$ to $R_4$ for hydrogen of methyl, and acid addition salts thereof.

Especially mentioned is the 5-cyclohex-1-enyl-pyrazole-3-carboxylic acid hydrazide and its therapeutically acceptable acid addition salts which, when given intraperitoneally or orally at doses between about 100 and 200 mg./kg./day to mice, or between about 100 and 300 mg./kg./day to rats, show outstanding tumor inhibiting effects in said test systems.

The compounds of this invention are prepared according to known methods. For example, the process for their preparation consists in (a) Reacting a reactive 5-R-pyrazole-3-carboxylic acid derivative with a hydrazine containing at least one hydrogen atom, more particularly those of the formulae

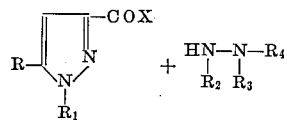

in which X stands for halogen or lower alkoxy, or (b) Condensing an oxime of an α,γ-dioxo-γ-R-butyric acid hydrazide with an unsubstituted or monosubstituted hydrazine, more particularly those of the formulae

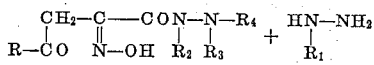

and, if desired, converting any resulting compound into another disclosed compound.

A reactive derivative of the acids mentioned under item (a) is, for example, a halide, such as the chloride or bromide, an ester, preferably a lower alkyl ester, the simple or a mixed anhydride.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure. Condensing agents may be used in the reaction with said acid halides, in order to eliminate the acid formed. They are basic agents, for example, alkali or alkaline earth metal carbonates, or organic nitrogen bases, such as pyridine or collidine, advantageously aliphatic tertiary amines, such as tri-lower alkylamines, e.g. triethylamine.

Resulting compounds may be converted into each other according to known methods. For example, compounds unsubstituted in the 1-position and/or the hydrazino moiety, may be reacted with reactive esters of alcohols, preferably of lower alkanols, e.g. those derived from hydrohalic, lower alkane or benzene sulfonic acids, in order to obtain the corresponding substituted derivatives or quaternaries. Compounds with a free terminal amino group may also be reacted with aldehydes or ketones, preferably lower alkanols or alkanones, in order to yield the corresponding acyl hydrazones.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and orginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts. For example, the acid derivatives mentioned under item (a) may be formed as intermediates and the hydrazines used in the form of their alkali metal, e.g. sodium or potassium salt. Mainly, those starting materials should be used in the process of the invention that lead to the formation of those compounds indicated above as being specially valuable.

The starting material used is known or, if new, may be prepared according to known methods. For example, that used in reaction (a) may be prepared by condensing compounds of the formula R—CO—CH₃ with an oxalic acid ester, hydrolysing the α,γ-dioxo-γ-R-butyrate obtained, condensing the resulting acid with a hydrazine and converting the 5-R-pyrazole-3-carboxylic acid obtained into a reactive derivative thereof by conventional methods. Said α,γ-dioxo-γ-R-butyrate may also be reacted first with a hydroxylamine and then with a hydrazine in order to obtain the starting material mentioned under item (b).

The compounds of the invention are useful, for example, in the manufacture of pharmaceutical compositions containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions, which are prepared by conventional methods, are also intended to be included within the scope of the present invention.

The following examples are intended to illustrate the invention and are not to be construed as being limitations thereon. Temperatures are given in degrees centigrade, and all parts wherever given are parts by weight.

EXAMPLE 1

The mixture of 11.0 g. 5-cyclohex-1-enyl-pyrazole-3-carboxylic acid and 120 ml. thionyl chloride is refluxed for ½ an hour and then evaporated in vacuo. The residue is taken up in benzene, the mixture filtered and the filtrate evaporated under reduced pressure. To the residue 25 ml. 95% hydrazine are added slowly, the mixture allowed to stand at the steam cone for 5 minutes and evaporated in vacuo. The residue is treated with water, the precipitate formed filtered off, washed with water, dried and recrystallized from methanol to yield the 5-cyclohex-1-enyl-pyrazole-3-carboxylic acid hydrazide of the formula

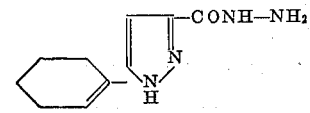

melting at 188–190°.

The starting material is prepared as follows: The dry sodium methylate obtained from 5.0 g. sodium is suspended in 1 liter diethyl ether and to the stirred suspension the solution of 25.0 g. 1-acetyl-cyclohexene in 30.0 g. ethyl oxalate is slowly added. The reaction mixture is allowed to stand for 2½ days at room temperature, protected from moisture. It is filtered, the residue washed with diethyl ether, dissolved in water and the solution acidified with diluted hydrochloric acid. It is extracted with diethyl ether, the extract washed with water, dried, filtered and evaporated to yield the ethyl α,γ-dioxo-γ-cyclohex-1-enyl-butyrate as a red oil.

The mixture of 20.0 g. thereof and 200 ml. 5% aqueous sodium hydroxide is stirred at the steam cone for 15 mintues. The solution obtained is chilled, acidified with diluted hydrochloric acid, filtered, the residue washed with water and recrystallized from diethyl ether-petroleum ether to yield the α,γ-dioxo-γ-cyclohex-1-enyl-butyric acid melting at 110–112°.

13.0 g. thereof are dissolved in 100 ml. ethanol and 25 ml. 95% hydrazine are added in portions. The mixture is heated at the steam cone for ½ an hour, concentrated to about 40 ml. and poured over ice. The aqueous solution is acidified with hydrochloric acid, the precipitate formed filtered off, washed with water, dried and recrystallized from methanol to yield the 5-cyclohex-1-enyl-pyrazole-3-carboxylic acid melting at 259–260° with decomposition.

EXAMPLE 2

To the solution of 32.2 g. ethyl, α,γ-dioxo-γ-cyclohex-1-enyl-butyrate in 50 ml. ethanol, the solution of 150 ml. 95% hydrazine in 250 ml. ethanol is added while stirring, and the mixture is refluxed for ½ an hour. It is concentrated to about 75 ml. and poured into 150 ml. ice water. The precipitated oil crystallizes on scratching; it is filtered off, washed with water, dried and recrystallized from methanol to yield the 5-cyclohex-1-enyl-pyrazole-3-carboxylic acid hydrazide melting at 188–190°; it is identical with the product obtained according to Example 1.

EXAMPLE 3

The mixture of 0.4 g. α-oximino-γ-oxo-γ-3-pyridyl-butyric acid hydrazide and 2 ml. 95% hydrazine is heated in the steam cone for 30 minutes. It is evaporated in vacuo, the residue dissolved in 10 ml. methanol containing 0.5 ml. hydrazine and the solution is refluxed for 1 hour. It is concentrated to ½ of its volume, poured into ice water, the precipitate formed filtered off, washed with water and diethyl ether, dried and recrystallized from methanol to yield the 5-(3-pyridyl)-pyrazole-3-carboxylic acid hydrazide of the formula

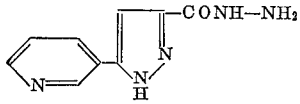

melting at 263–265° with decomposition.

The starting material is prepared as follows: The dry sodium methylate obtained from 5.8 g. sodium is added to the solution of 28.0 g. 3-acetyl-pyridine and 36.8 g. ethyl oxylate in 50 ml. diethyl ether while stirring and cooling. The reaction mixture is allowed to stay for 3 days at room temperature, protected from moisture. It is poured into 220 ml. ice water and the stirred solution acidified with 18% aqueous hydrochloric acid to a pH of 5.5. The precipitate formed is filtered off, washed with water and recrystallized from ethanol to yield the methyl α,γ-dioxo-γ-(3-pyridyl)-butyrate melting at 119–121° with decomposition. (During the reaction transesterification has taken place.)

The mixture of 5.0 g. thereof, 1.6 g. hydoxylamine hydrochloride and 50 ml. ethanol is refluxed for 1 hour. It is evaporated in vacuo and the residue recrystallized from ethanol-methanol to yield the methyl α-oximino-γ-oxo-γ-(3-pyridyl)-butyrate hydrochloride melting at 201–202°.

The solution of 1.0 g. thereof in the minimal amount of ethanol is added to saturated aqueous sodium bicarbonate, the corresponding liberated base filtered off and recrystallized from methanol-diethyl ether; it melts at 133–135°.

The mixture of 0.5 g. thereof, 5 drops 95% hydrazine and 10 ml. ethanol is allowed to stand at room temperature overnight. It is evaporated in vacuo and the residue recrystallized from methanol to yield the α-oximino-γ-oxo-γ-(3-pyridyl)-butyric acid hydrazide melting at 192–194° with decomposition.

EXAMPLE 4

To the solution of 11.6 g. methyl α,γ-dioxo-γ-(3-pyridyl)-butyrate in 150 ml. ethanol, 20 ml. 95% hydrazine in 50 ml. ethanol are added while stirring. The mixture is heated on the steam cone from 10 minutes, concentrated to about 200 ml., chilled and filtered. The residue is dissolved in 500 ml. methanol containing 50 ml. hydrazine and the solution refluxed for ¾ of an hour. It is concentrated to 200 ml., poured into water, the precipitate formed filtered off, washed with water and diethyl ether, dried and recrystallized from methanol to yield the 5-(3-pyridyl)-pyrazole-3-carboxylic acid hydrazide melting at 263–265° with decomposition; it is identical with the product obtained according to Example 3.

EXAMPLE 5

Preparation of 1000 tablets each containing 500 mg. of the active ingredient:

Formula g.
5-cyclohex-1-enyl-pyrazole-3-carboxylic acid
  hydrozide _____ 500.0
Wheat starch _____ 96.8
Magnesium aluminum silicate _____ 20.0
Methylcellulose _____ 13.3
Stearic acid _____ 13.3
Colloidal silica _____ 6.6
Anhydrous ethanol _____ q.s.
Purified water _____ q.s.

Procedure

All powders with the exception of the silica and starch are passed through a screen having openings of 0.6 mm. and mixed well. From the starch and 65 ml. water a paste is formed which is used to granulate the powders together with the ethanol. The wet granulate is passed through a screen with 2 mm. openings and dried overnight at 35° The dry granulate is broken in a hammer mill, passed through a screen with 1.2 mm. openings and compressed into tablets each weighing 0.65 g., using concave punches with 12 mm. diameter, uppers quartered.

What is claimed is:

1. A compound selected from the group consisting of a compound having the general formula

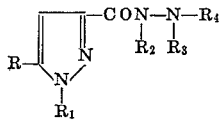

in which R is a member selected from the group consisting of 1-cyclopentenyl, 1-cyclohexenyl, 1-cycloheptenyl, (lower alkyl)-cyclopent-1-enyl, (lower alkyl)-cyclohex-1-enyl, (lower alkyl)-cyclohep-1-enyl, pyridyl and (lower alkyl)-pyridyl, each of $R_1$ to $R_4$ is a member selected from the group consisting of hydrogen and lower alkyl and therapeutically acceptable acid addition salts thereof.

2. A compound as claimed in claim 1 and having the formula

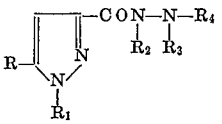

in which R stands for a member selected from the group consisting of 1-cyclohexenyl, (lower alkyl)-cyclohex-1-enyl, pyridyl and (lower alkyl)-pyridyl, each of $R_1$ to $R_4$ for a member selected from the group consisting of hydrogen and methyl, and of which the salts are therapeutically acid addition salts.

3. A compound as claimed in claim 1 and being a member selected from the group consisting of 5-cyclohex-1-enyl-pyrazole-3-carboxylic acid hydrazide and a therapeutically acceptable acid addition salt.

4. A compound as claimed in claim 1 and being a member selected from the group consisting of 5-(3-pyridyl)-pyrazole-3-carboxylic acid hydrazide and a therapeutically acceptable acid addition salt.

References Cited

UNITED STATES PATENTS 2,906,755  9/1959  Kuhle et al. _____ 260—295

HENRY R. JILES, *Primary Examiner.*

ALAN L. ROTMAN, *Asssistant Examiner.*

U.S. Cl. X.R.

424—263, 273; 260—294.8, 295, 310, 468, 557

CASE SU-483/14

PO-1050
(5/69)

UNITED STATES PATENT OFFICE
CERTIFICATE OF CORRECTION

Patent No. 3,449,350        Dated   June 10, 1969

Inventor(s)  GORDON NORTHROP WALKER

It is certified that error appears in the above-identified patent and that said Letters Patent are hereby corrected as shown below:

Column 6, line 48, before "acid", insert --- acceptable ---

SIGNED AND
SEALED
NOV 17 1970

(SEAL)
Attest:

Edward M. Fletcher, Jr.
Attesting Officer

WILLIAM E. SCHUYLER, JR.
Commissioner of Patents